(12) United States Patent
Hu et al.

(10) Patent No.: US 12,337,487 B2
(45) Date of Patent: Jun. 24, 2025

(54) ROBOT CONTROL APPARATUS AND METHOD, AND ROBOT

(71) Applicant: Gree Electric Appliances, Inc. of Zhuhai, Guangdong (CN)

(72) Inventors: Yusheng Hu, Guangdong (CN); Changkai Wang, Guangdong (CN); Feipeng Hu, Guangdong (CN); Qinwei Zhu, Guangdong (CN); Xiancai Yu, Guangdong (CN); Lei Lei, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 229 days.

(21) Appl. No.: 18/010,086

(22) PCT Filed: May 17, 2021

(86) PCT No.: PCT/CN2021/094043
§ 371 (c)(1),
(2) Date: Dec. 13, 2022

(87) PCT Pub. No.: WO2022/057292
PCT Pub. Date: Mar. 24, 2022

(65) Prior Publication Data
US 2023/0347523 A1 Nov. 2, 2023

(30) Foreign Application Priority Data

Sep. 16, 2020 (CN) .......................... 202010974687.4

(51) Int. Cl.
*B25J 9/00* (2006.01)
*B25J 9/16* (2006.01)
(52) U.S. Cl.
CPC .................................. *B25J 9/1676* (2013.01)

(58) Field of Classification Search
CPC .... B25J 9/1676; B25J 19/0004; B25J 9/1674; B25J 9/1602; B25J 9/042
See application file for complete search history.

(56) References Cited

U.S. PATENT DOCUMENTS

| 9,533,416 B2 | 1/2017 | Garde |
| 2006/0192515 A1 | 8/2006 | Takayama et al. |

(Continued)

FOREIGN PATENT DOCUMENTS

| CN | 104626164 A | 5/2015 |
| CN | 104678859 A | 6/2015 |

(Continued)

OTHER PUBLICATIONS

Translation of CN-105643637-A. Yang et al. Industrial robot motor band-type brake controller with safety monitoring device. Jun. 8, 2016. (Year: 2016).*

(Continued)

*Primary Examiner* — Khoi H Tran
*Assistant Examiner* — Tien Minh Le
(74) *Attorney, Agent, or Firm* — The Webb Law Firm (57) ABSTRACT

The present disclosure provides a robot control apparatus. The apparatus includes: a signal acquisition unit configured to obtain, in the case that a robot triggers emergency stop and if the body switch of the robot is turned on, a switch turn-on signal that the body switch of the robot is turned on; a control unit configured to output an enable release control signal; a logic processing unit configured to perform logic processing on the switch turn-on signal if the switch turn-on signal is received, then output a manual release signal, perform logic processing on the enable release control signal if the enable release control signal is received, and then output an enable release signal; and a signal output unit configured to control, if the manual release signal or the (Continued)

enable release signal is received, the motor of the robot to release a band brake.

13 Claims, 5 Drawing Sheets

(56) References Cited

U.S. PATENT DOCUMENTS

| | | | | |
|---|---|---|---|---|
| 2008/0309273 | A1* | 12/2008 | Kamiya | B25J 19/0004 318/563 |
| 2013/0264890 | A1* | 10/2013 | Le | G05B 9/02 307/143 |
| 2015/0290806 | A1* | 10/2015 | Garde | B25J 19/0004 901/20 |
| 2017/0063259 | A1 | 3/2017 | Schoenlinner et al. | |

FOREIGN PATENT DOCUMENTS

| | | |
|---|---|---|
| CN | 205043783 U | 2/2016 |
| CN | 105643637 A * | 6/2016 |
| CN | 206481186 U | 9/2017 |
| CN | 108406783 A | 8/2018 |
| CN | 108736767 A | 11/2018 |
| CN | 208276916 U | 12/2018 |
| CN | 109264517 A | 1/2019 |
| CN | 109291054 A | 2/2019 |
| CN | 208930307 U | 6/2019 |
| CN | 112276939 A | 1/2021 |
| EP | 1974870 A1 | 10/2008 |
| EP | 3142247 A1 | 3/2017 |
| JP | 2004306159 A | 11/2004 |
| JP | 2005118967 A | 5/2005 |
| JP | 2007192785 A | 8/2007 |
| JP | 2019158047 A | 9/2019 |

OTHER PUBLICATIONS

JP 2022-576375, "Notice of Reasons for Refusal", Jan. 14, 2025.

* cited by examiner

ROBOT CONTROL APPARATUS AND METHOD, AND ROBOT

CROSS-REFERENCE TO RELATED APPLICATIONS

This application is the United States National Phase of International Application No. PCT/CN2021/094043, filed on May 17, 2021, and claims priority to Chinese Patent Application No. 202010974687.4, filed Sep. 16, 2020, the disclosures of which are hereby incorporated by reference in their entireties.

BACKGROUND OF THE INVENTION

Field of the Invention

The present disclosure relates to a robot control device, a robot control method and a robot.

Description of Related Art

With the boosting of industrial automation reform, various industrial robots have become the solution for many enterprises. The SCARA (Selective Compliance Assembly Robotic Arm, which is a robotic arm used in assembly operations) robot is one type of robots that have been widely used.

The above content is only used to assist the understanding of the technical solution of the present disclosure, and does not represent an admission that the above content is the prior art.

SUMMARY OF THE INVENTION

One aspect of the present disclosure provides a robot control device, comprising: a signal acquisition unit, a control unit, a logic processing unit, and a signal output unit; wherein: the signal acquisition unit is configured to acquire a switch turn-on signal indicating that a body switch of a robot is turned on if the body switch of the robot is turned on in a case where the robot triggers an emergency stop and braking of a motor of the robot can be manually released; the control unit is configured to output an enable release control signal in a case where the robot triggers the emergency stop and the braking of the motor of the robot can be released by enable control; the logic processing unit is configured to output a manual release signal after performing logic processing on the switch turn-on signal if the switch turn-on signal is received, and output an enable release signal after performing logic processing on the enable release control signal if the enable release control signal is received; and the signal output unit is configured to control the braking of the motor of the robot to be released in a case where the manual release signal or the enable release signal is received.

Another aspect of the present disclosure provides a robot, comprising: the robot control device described above.

Another aspect of the present disclosure provides a robot control method, comprising: acquiring, by a signal acquisition unit, a switch turn-on signal indicating that a body switch of a robot is turned on if the body switch of the robot is turned on in a case where the robot triggers an emergency stop and braking of a motor of the robot can be manually released; outputting, by a control unit, an enable release control signal in a case where the robot triggers the emergency stop and the braking of the motor of the robot can be released by enable control; outputting, by a logic processing unit, a manual release signal after performing logic processing on the switch turn-on signal if the switch turn-on signal is received, and outputting an enable release signal after performing logic processing on the enable release control signal if the enable release control signal is received; and controlling, by a signal output unit, the braking of the motor of the robot to be released in a case where the manual release signal or the enable release signal is received.

Other features and advantages of the present disclosure will be set forth in the following description, and partly become apparent in the following description or become known through the implementation of the present disclosure.

Below, the technical solution of the present disclosure will be further described in detail with reference to the accompanying drawings and embodiments.

DESCRIPTION OF THE INVENTION

In order to make the objectives, technical solutions, and advantages of the present disclosure more clear, the technical solutions of the present disclosure will be described clearly and completely in combination with specific embodiments of the present disclosure and corresponding drawings. Obviously, embodiments described are only a part of the embodiments of the present disclosure, and not all of embodiments thereof. All other embodiments obtained by those of ordinary skill in the art based on the embodiments of the present disclosure without creative efforts shall fall within the protection scope of the present disclosure.

The inventors of the present disclosure have found that, in the related art known to the inventors, upon emergency stop protection is triggered by a SCARA robot, its robotic arm cannot be moved without power off and restart, which may cause secondary damage to the robot or surrounding equipment, thereby posing potential safety hazards.

In view of this, embodiments of the present disclosure provide a robot control device, a robot control method or a robot to solve the problem that upon emergency stop protection is triggered by a SCARA robot, its robotic arm cannot be moved without power off and restart, which may cause secondary damage to the robot or surrounding equipment, and thereby posing serious potential safety hazards. Therefore, an effect of preventing secondary damage to the robot or surrounding equipment and eliminating safety hazards through the control of releasing the braking for the SCARA robot can be achieved.

Figure 1:
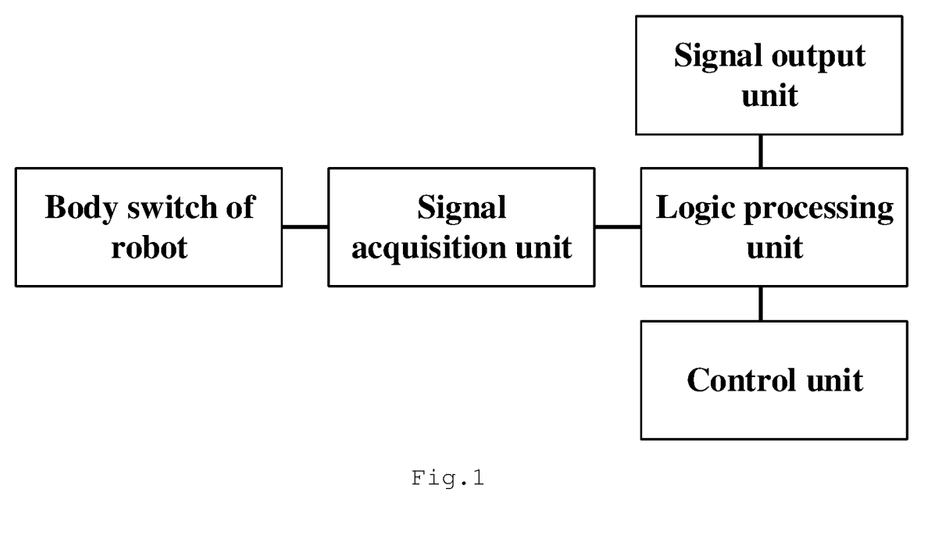
FIG. 1 is a schematic structural diagram of some embodiments of a robot control device of the present disclosure.

According to some embodiments of the present disclosure, a robot control device is provided. Referring to FIG. 1, a schematic structural diagram of some embodiments of the device of the present disclosure is shown. The robot control device can be applied to a releasing the braking control of the motor of a SCARA robot. The releasing the braking control device of the motor of the SCARA robot comprises: a signal acquisition unit, a control unit, a logic processing unit, and a signal output unit. A FPGA can be used for the control unit.

Specifically, the signal acquisition unit is connected to a body switch (such as, a self-reset switch) of the robot, and is configured to acquire a switch turn-on signal indicating that the body switch of the robot is turned on if the body switch of the robot is turned on in a case where the robot triggers an emergency stop and braking of a motor of the robot can be manually released.

Specifically, the control unit is configured to output an enable release control signal in a case where the robot triggers the emergency stop and the braking of the motor of the robot can be released by enable control.

Specifically, the logic processing unit is configured to output a manual release signal after performing logic processing on the switch turn-on signal if the switch turn-on signal is received in the case where the robot triggers the emergency stop and the braking of the motor of the robot can be manually released, and output an enable release signal after performing logic processing on the enable release control signal if the enable release control signal is received in the case where the robot triggers the emergency stop and the braking of the motor of the robot can be released by enable control.

Specifically, the signal output unit is configured to control the braking of the motor of the robot to be released in a case where the manual release signal or the enable release signal is received. A braking signal is provided separately for one or more motors in the robot. Since the brake signal lines are not connected to each other, but are provided independently, and only the switch signal of the body switch of the robot is used as a unique signal input, braking can be released regardless of whether the body switch is pressed or whether internal software control is enabled. In the non-emergency state, each axis can be enabled and controlled separately by software.

For example: in a case where a release brake signal and an enable signal are transmitted: both of the two release brake situations can be achieved after adding the hardware loop. Specifically, releasing brake can be achieved through pressing a switch on the "robot" without software control. Braking of the motor can also be released for the robot upon an enable signal is transmitted by software control.

In the case where the braking is released manually, the self-reset switch is pressed, the "SW_IN" network is grounded, and a low level (logic level 0) is output. In this situation, the preceding-stage optocoupler circuit is turned on, the networks "SW" and "SW_0" are pulled up and output a high level. Then, a triode transistor circuit is turned on, the "SW_SIG" network is grounded and outputs a low level (logic level 0). According to $Y=A \cdot B$, it can be known that a logic level 0 is output, that is, networks "BRK0-" and "BRK1-" output a low level, the post-stage optocoupler circuit is then turned on, so that a signal "BRK1"/"BRK2" output to the motor is grounded, a low level is output, and the braking is released.

if FPGA control is enabled, signal networks "F_BRK0" and "F_BRK1" input to an AND gate (i.e., a second logic gate circuit) by the FPGA are controlled by software to output a low level (logic level 0). According to $Y=A \cdot B$, it can be known that a logic level 0 is output, that is, networks "BRK0-" and "BRK1-" output a low level. The post-stage optocoupler circuit is then turned on, the signal "BRK1"/"BRK2" output to the motor is grounded, a low level is output, and the braking is released.

Therefore, a hardware control loop can be formed and a software control loop can be compatible by the signal acquisition unit, the control unit, the logic processing unit and the signal output unit, which makes emergency movement of the SCARA robot when no drive loop possible. For example, for the problem of unable to move the robotic arm without power off and restart after the emergency stop, for example, the problem that the user needs to quickly unbrake the third and fourth axes of the SCARA robot in an emergency state, when the SCARA robot is in an emergency state or no drive loop is available, the operator can manually release the braking of the motor and move the robotic arm, thereby improving safety.

Therefore, in the solution of the present disclosure, through adding a hardware control loop that is compatible with a software control loop, when the SCARA robot is in an emergency state or no drive loop is available, the operator can manually release the braking of a motor and move the robotic arm, thereby enabling emergency movement of the SCARA robot when no drive loop is available. Therefore, through releasing the braking control of the motor of the SCARA robot, secondary damage to the robot or surrounding equipment can be prevented to eliminate safety hazards.

In some embodiments, the signal acquisition unit, the control unit, the logic processing unit, and the signal output unit are implemented separately through a circuit.

In some embodiments, the body switch of the robot comprises: a self-reset switch, wherein a first terminal of the self-reset switch is connected to an input terminal (such as, a SW_IN terminal) of the signal acquisition unit, and a second terminal of the self-reset switch is grounded (for example, connected to the analog ground GND). The self-reset switch is a normally open switch, and is turned on when it is pressed. For example: the switch signal of the body switch of the robot is only used as a signal input, and is not directly connected to a brake line.

During emergency stop control, control can be performed by the control unit. Specifically, the control unit outputs an enable brake control signal in a case where the robot needs to trigger an emergency stop. The logic processing unit, in a case where the robot needs to trigger an emergency stop and if the enable brake control signal is received, outputs an enable brake signal after performing logic processing on the enable brake control signal. The signal output unit controls a motor of the robot to brake when receiving the enable brake signal.

In a case where the motor of the robot has triggered an emergency stop through the control unit, if the self-reset switch is reset, the state of braking of the motor will not be affected. For details, please refer to the following exemplary description.

The robot control device further comprises: a process of maintaining braking of the motor after the self-reset switch is reset, specifically comprising:

The signal acquisition unit configured to acquire a switch turn-off signal indicating that the self-reset switch of the robot is turned off if the self-reset switch of the robot has been turned off through self-resetting in a case where the robot triggers the emergency stop through the control unit and the motor of the robot is braked.

The logic processing unit configured to output a maintenance braking signal after performing logic processing on the switch turn-off signal if the switch turn-off signal is received in a case where the robot triggers the emergency stop through the control unit and the motor of the robot is braked.

The signal output unit configured to control the motor of the robot to maintain a braking state in a case where the maintenance braking signal is received.

In the braking state: when the motor is not under control, it should be in the braking state, that is, "BRK1" and "BRK2" signals should be in a high level state. A motor that is not under control means that it is not under software control. Upon adding a hardware loop, it is still necessary to realize the high level state of the "BRK1" and "BRK2" signals.

When a motor is not under software control, the signal networks F_BRK0 and F_BRK1 input to a second logic gate circuit (i.e., AND gate) by the FPGA are pulled up and output a high level (logic level 1). At that point, the switch is in a turn-off state, and the "SW_IN" network is pulled up by the "24V_CTRL" power supply network. In the situation, the preceding-stage optocoupler circuit is not turned on. The "SW" and "SW_0" networks are grounded. In the situation, the triode transistor circuit is not turned on, the "SW_SIG" network is pulled up and a high level (logic level 1) is output. According to Y=A·B, it can be known that a logic level 1 is output, that is, the networks "BRK0-" and "BRK1-" output a high level. In the case, the post-stage optocoupler circuit is also not turned on, and the signal "BRK1"/"BRK2" output to the motor is directly pulled up by "24V_IO", and thereby outputs a high level, and the motor enters the braking state, which is consistent with the requirement.

Since the body switch of the robot is a self-reset switch, releasing the button will automatically return it to the open (non-closed) state, in which situation the produced signal is in a sense no different from that before the hardware circuit is added. Therefore, it is compatible with the software.

Therefore, since a self-reset switch is used as the body switch of the robot, there is no need to worry about safety problems caused by failure to brake in time. Specifically, a self-reset switch is used as the body switch of the robot. The self-reset switch is adopted when a brake is manually released. If the operator accidentally forgets to reset the button, the robotic arm will not fall down uncontrollably to avoid other dangers, thereby preventing the situation that the motor always stays in the braking release state during operation, and thus ensuring safety.

In some embodiments, the device further comprises a sampling unit. For example, the sampling unit is implemented through a circuit. The process of monitoring the state of the body of the robot specifically comprises:

The sampling unit is configured to collect a current signal on a brake signal line of the robot and feedback the collected current signal to a feedback terminal of the control unit. The collected current signal is a current signal on a BRK1- or BRK2-signal line connected to the motor.

The control unit is further configured to monitor a state of a body of the robot according to the current signal of the body of the robot and a switch signal of the body switch of the robot; wherein the switch signal of the body switch of the robot comprises: a switch turn-on signal indicating that the body switch of the robot is turned on, or a switch turn-off signal indicating that the body switch of the robot is turned off. Specifically, the switch signal of the body switch of the robot is a switch signal output by an emitter of a transistor side in a preceding-stage optocoupler circuit, such as a first optocoupler, in the signal acquisition unit.

For example: in addition to adding a hardware control loop, a switch signal is introduced. The switch signal can be divided into two signals, one (SW_SIG) of which is a signal input involved in braking release, and the other (SW) is a feedback signal input to the FPGA (Field Programmable Gate Array). The switch signal input to the FPGA and the sampled current signal input to the FPGA can form a safety feedback loop to monitor the state of the body braking (or releasing braking) loop.

Therefore, in addition to adding a hardware control loop, a safety feedback loop is formed by introducing a switch signal in combination with the current sampling circuit, so as to further increase the safety of the robot.

In some embodiments, the control unit monitoring the state of the body of the robot according to the current signal of the body of the robot and the switch signal of the body switch of the robot comprises:

The control unit is further configured to determine that the body switch of the robot is turned on due to misoperation, control the robot to stop and initiate an alert message that the robot is misoperated during normal operation, in a case where the robot is in normal operation, if the current signal indicates that the robot is in normal operation and the switch signal indicates that the body switch of the robot is turned on from a turn-off state.

The control unit is configured to determine that the robot is started by mistake and control the robot to disable starting, in a case where the robot is in a braking state, if the current signal indicates that the robot is in the braking state and the switch signal indicates that the body switch of the robot is turned on from the turn-off state.

For example: in a case where the hardware control loop is compatible with the software control loop, when the entire system is not in an emergency state (that is, the emergency stop button is not pressed), releasing the braking can be controlled by both the hardware control loop and the software control loop. In the case, the switch signal can be divided into two signals, one (SW_SIG) of which is a signal involved in braking release, and the other (SW) is input to the FPGA as a feedback signal.

If the internal programs of the robot run normally, the robotic arm maintains its original state by a maintenance current, and should not be receive a low level SW signal. If the body switch of the robot (i.e., the self-reset switch) is pressed in the normal operation of the robot to avoid safety accidents caused by human misoperation, the feedback signal SW should be involved. The FPGA detects an abnormal low level, stops the robot, and issues an alert. If the body switch is pressed for debugging, in the case, if someone wants to start the robot, the FPGA will disable the starting of the robot based on the sampled current signal (which is converted into a digital signal by an AD chip and input to the FPGA as a feedback of the body state) and the SW signal (a signal controlling the body switch), thereby avoiding safety accidents.

In some embodiments, a number of an output terminal of the signal acquisition unit, a number of the logic processing unit, and a number of the signal output unit are consistent with a number of the motor in the robot that need to be braked or released from braking. That is, the number of the output terminal of the signal acquisition unit, the number of the logic processing unit, and the number of the signal output unit are the same as the number of the motor in the robot that need releasing the braking control, or the number of motor that need braking control. That is, the number of the output terminal of the signal acquisition unit, the number of the logic processing unit, and the number of the signal output unit are one or more, and each of the one or more signal output units corresponds to a motor in the robot that needs to be released from braking. The control of releasing the braking can be performed on a motor in the robot that needs to released from braking. For example: the one or more signal output units are two signal output units, comprising a first signal output unit and a second signal output unit, which can output release control signals for two braked motors.

In some embodiments, in a case where the number of the motor in the robot that need to be braked or released from the braking is two, the motor in the robot that need to be braked or released from the braking comprises a first motor and a second motor, for example, a third axis motor and a fourth axis motor of the SCARA robot. The output terminal of the signal acquisition unit comprises: a first output terminal and a second output terminal. The logic processing unit comprises: a first logic processing unit and a second logic processing unit. The signal output unit comprises: a first signal output unit and a second signal output unit.

The first output terminal of the signal acquisition unit is connected to a first input terminal of the first logic processing unit. An output terminal of the first logic processing unit is connected to an input terminal of the first signal output unit. An output terminal of the first signal output unit is connected to a control terminal of the first motor which is for braking or releasing the braking.

The second output terminal of the signal acquisition unit is connected to a first input terminal of the second logic processing unit. An output terminal of the second logic processing unit is connected to an input terminal of the second signal output unit. An output terminal of the second signal output unit is connected to a control terminal of the second motor which is for braking or releasing the braking. For example, the control terminal of the robot which is for braking of the motor or releasing the braking is a brake line for braking of the motor or releasing braking of the robot.

A first enable control terminal of the control unit is connected to a second input terminal of the first logic processing unit. A second enable control terminal of the control unit is connected to a second input terminal of the second logic processing unit.

For example: in the control process for releasing the braking, the first output terminal of the signal acquisition unit outputs a switch turn-on signal obtained by the signal acquisition unit and indicating that the body switch of the robot is turned on to the first input terminal of the first logic processing unit. The first enable control terminal of the control unit outputs an enable release control signal to the second input terminal of the first logic processing unit. In a case where the robot triggers an emergency stop and braking of the motor of the robot can be manually released, if the switch turn-on signal is received, the first logic processing unit outputs a manual release signal for the first motor after performing logic processing on the switch turn-on signal. In a case where the robot triggers an emergency stop and braking of the motor of the robot can be released by enabling control, if the enable release control signal is received, the first logic processing unit outputs an enable release signal for the first motor after performing logic processing on the enable release control signal. The first signal output unit controls the first motor of the robot to release the braking in the case of receiving the manual release signal for the first motor or the enable release signal for the first motor.

Moreover, the second output terminal of the signal acquisition unit outputs a switch turn-on signal obtained by the signal acquisition unit and indicating that the body switch of the robot is turned on to the second input terminal of the second logic processing unit. The second enable control terminal of the control unit outputs an enable release control signal to the second input terminal of the second logic processing unit. In a case where the robot triggers an emergency stop and braking of the motor of the robot can be manually released, if the switch turn-on signal is received, the second logic processing unit outputs a manual release signal for the second motor after performing logic processing on the switch turn-on signal. In a case where the robot triggers an emergency stop and braking of the motor of the robot can be released by enabling control, if the enable release control signal is received, the second logic processing unit outputs an enable release signal for the second motor after performing logic processing on the enable release control signal. The second signal output unit controls the second motor of the robot to release the braking in the case of receiving the manual release signal for the second motor or the enable release signal for the second motor.

For another example: in the process of braking control through enabling of the control unit, that is, during the emergency stop control, in a case where the robot needs to trigger an emergency stop, a first enable control terminal of the control unit outputs an enable brake control signal to the second input terminal of the first logic processing unit. The first logic processing unit, in a case where the robot needs to trigger an emergency stop and if the enable brake control signal is received, outputs an enable brake signal to the first signal output unit after performing logic processing on the enable brake control signal. The first signal output unit controls the first motor of the robot to brake in a case of receiving the enable brake signal.

Moreover, in a case where the robot needs to trigger an emergency stop, a second enable control terminal of the control unit outputs an enable brake control signal to the second input terminal of the second logic processing unit. The second logic processing unit, in a case where the robot needs to trigger an emergency stop and if the enable brake control signal is received, outputs an enable brake signal to the second signal output unit after performing logic processing on the enable brake control signal. The second signal output unit controls the second motor of the robot to brake in a case of receiving the enable brake signal.

For another example: in the braking maintenance control process, the first output terminal of the signal acquisition unit outputs a switch turn-off signal obtained by the signal acquisition unit and indicating that the body switch of the robot is turned off to the first input terminal of the first logic processing unit. In a case where the robot triggers an emergency stop through the control unit and a motor of the robot is braked, if the switch turn-off signal is received, the first logic processing unit outputs a maintenance braking signal for the first motor after performing logic processing on the switch turn-off signal. The first signal output unit controls the first motor of the robot to maintain braking in a case of receiving the maintenance braking signal for the first motor.

Moreover, the second output terminal of the signal acquisition unit outputs a switch turn-off signal obtained by the signal acquisition unit and indicating that the body switch of the robot is turned off to the second input terminal of the second logic processing unit. In a case where the robot triggers an emergency stop through the control unit and a motor of the robot is braked, if the switch turn-off signal is received, the second logic processing unit outputs a maintenance braking signal for the second motor after performing logic processing on the switch turn-off signal. The second signal output unit controls the second motor of the robot to maintain braking in a case of receiving the maintenance braking signal for the second motor.

Therefore, through adding a hardware control loop that is compatible with a software control loop, when the SCARA robot is in an emergency state or has no drive loop, the operator can manually release braking of the motor and move the robotic arm. Therefore, the user can rapidly release braking of the motor for the third and fourth axes of the SCARA robot in an emergency state, and thereby improving safety.

In some embodiments, the signal acquisition unit comprises: a first optocoupler module, a first switch module and a second switch module. A diode side of the first optocoupler module is connected to the body switch of the robot. A transistor side of the first optocoupler module is capable of outputting a switch signal of the body switch of the robot. For example, the first optocoupler module, the first switch module and the second switch module are implemented separately through a circuit.

The switch signal of the body switch of the robot is output to the first input terminal of the first logic processing unit after being processed by the first switch module. An output terminal of the first switch module is the first output terminal of the signal acquisition unit.

The switch signal of the body switch of the robot is output to the first input terminal of the second logic processing unit after being processed by the second switch module. An output terminal of the second switch module is the second output terminal of the signal acquisition unit.

In a case where the robot control device further comprises a sampling unit, the switch signal of the body switch of the robot is further output to a feedback terminal of the control unit (such as the SW terminal of the FPGA). For example, the switch signal of the body switch of the robot is further output to a feedback terminal of the FPGA to form a safety feedback loop with the current signal sampled by the sampling unit, for monitoring the state of a braking (or releasing braking) loop of the robot body.

For example: the first optocoupler module comprises: a resistor R1 and a preceding-stage optocoupler circuit, such as a first optocoupler OC1. The resistor R1 is connected in parallel between an anode and a cathode of a diode side of the first optocoupler OC1.

Therefore, through constituting the signal acquisition unit by the first optocoupler module, the first switch module and the second switch module, the switch signal of the body switch of the robot can be reliably acquired. Therefore, a motor can be controlled to be released the braking according to the switch signal, and a state of the motor can be monitored, thereby achieving hardware control and software monitoring.

In some embodiments, a structure of the first switch module is the same as a structure of the second switch module. The first switch module comprises a first triode transistor module. A base of the first triode transistor module is connected to an emitter of the transistor side of the first optocoupler module. A collector of the first triode transistor module, as an output terminal of the first switch module, is connected to the first input terminal of the first logic processing unit.

For example: the first triode transistor module can use a triode transistor circuit. The triode transistor circuit comprises: a resistor R2, a resistor R3, a resistor R4 and a resistor R5, a capacitor C1, a diode D1, and a triode Q1.

Therefore, by forming the first switch module mainly using the first triode transistor module, the switch signal of the body switch of the robot acquired by the first optocoupler module can be processed and output to the first logic processing unit. The structure is simple, reliable and safe.

In some embodiments, a structure of the first logic processing unit is the same as a structure of the second logic processing unit. The first logic processing unit comprises a first AND gate module. For example, the first AND gate module is implemented through a circuit.

A first input terminal of the first AND gate module is connected to the first output terminal of the signal acquisition unit. A second input terminal of the first AND gate module is connected to the first enable control terminal of the control unit. An output terminal of the first AND gate module is connected to the input terminal of the first signal output unit. By means of a logic gate circuit, the robot can brake only if the body switch of the robot is not pressed and the internal software of the controller gives a braking signal.

Therefore, through using an AND gate module as the first logic processing unit, the motor release brake can be controlled by both hardware and software to enable emergency movement of the SCARA robot when no drive loop is available.

In some embodiments, a structure of the first signal output unit is the same as a structure of the second signal output unit. The first signal output unit comprises a second optocoupler module. For example, the second optocoupler module is implemented through a circuit.

A cathode of a diode side of the second optocoupler module is connected to the output terminal of the first logic processing unit. An emitter of a transistor side of the second optocoupler module is connected to a control terminal of the first motor which is for braking or releasing the braking. A second optocoupler OC2 can be used as the second optocoupler module. A diode is provided between an emitter of a transistor side in the second optocoupler OC2 and a direct-current power supply.

For example: a switch signal of the body switch of the robot, i.e., a self-reset switch, is input to an input terminal of the first logic gate circuit after passing through a preceding-stage optocoupler circuit and a triode transistor circuit. A control signal of the FPGA is input to the input terminal of the first logic gate circuit through a drive circuit. Two signals are input to the first logic gate circuit, which outputs a braking (or releasing braking) control signal that is output to an input terminal of a post-stage optocoupler circuit. The output signal of the post-stage optocoupler circuit is pulled up and output to an external robot motor.

Therefore, by using a second optocoupler module as the first signal output unit, the output signal of the first logic processing unit is isolated and then output to a control terminal of the first motor which is for braking or releasing braking, so that the motor can be controlled to be released from braking based on hardware or software control in a reliable and safe manner.

The technical solution of the present disclosure has been verified after extensive testing. Through adding a hardware control loop that is compatible with a software control loop, in normal operation, the added hardware circuit will not affect the software control; if a safety accident occurs and an emergency stop button is pressed in time, the robotic arm needs to be moved away for rescue or assets protection or the robotic arm needs to be moved back to a safety range. In the situation, releasing the braking can only be achieved through hardware control, in which the release brake control can be performed on a motor of the SCARA robot to prevent secondary damage to the robot or surrounding equipment to eliminate safety hazards.

According to some embodiments of the present disclosure, a robot corresponding to the robot control device is further provided. The robot comprises: the robot control device described above.

The SCARA robot has the advantages of: (1) compact structure, high utilization rate of working space; (2) flexible action, high speed, high repetition accuracy, high work efficiency; (3) easy to operate, with a variety of installation methods; (4) few parts, low manufacturing cost, easy disassembly and maintenance, etc., so it is widely used in a narrow place having a high requirement for accuracy. For example: the SCARA robot is commonly used in the 3C electronic industry for assembly, disassembly and sorting.

Figure 2:
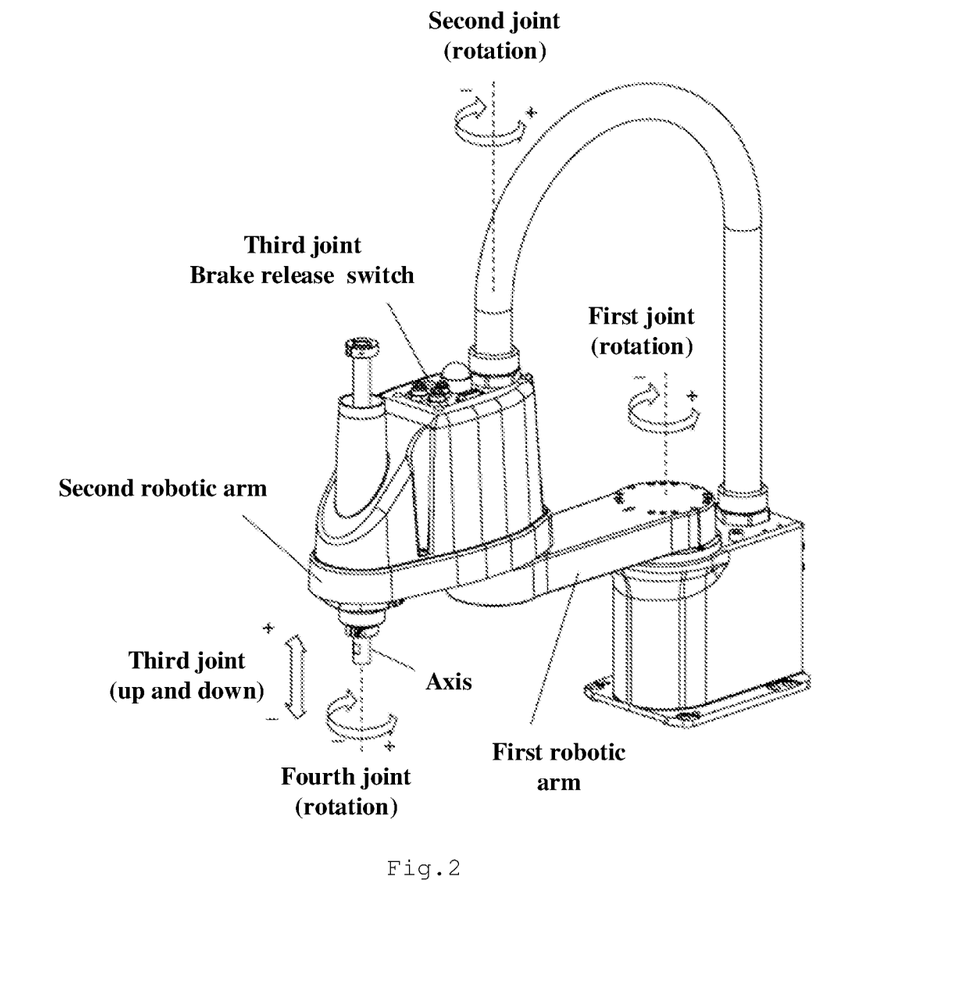
FIG. 2 is a schematic structural diagram of some embodiments of a SCARA robot.

FIG. 2 is a schematic structural diagram of some embodiments of a SCARA robot. As shown in FIG. 2, the SCARA robot uses 4 motors to control the motion of 4 joints (i.e., a first joint, a second joint, a third joint and a fourth joint): first-axis, second-axis and fourth-axis horizontal rotating joints, and a third-axis up and down joint. In general, due to the inertia influence such as gravity of the end tooling fixture, motors with brake holding capability should be selected for the third-axis motor and fourth-axis motor to prevent the joint arm from falling down by brake holding inside the motor in case of power failure; for the first-axis motor and the second-axis motor, whether they need to have a braking function can be flexibly determined according to the robot assembly method.

Furthermore, the use of the motor with the brake can pose some problems in actual use, for example:

On the one hand, during the production process, due to the robot program running away from an original preset routine, the end fixture of the SCARA robot may collide with surrounding objects or equipment. In the situation, the user may press an emergency stop switch (such as demonstrator emergency stop or external emergency stop), the third-axis motor and fourth-axis motor brake, and the robot controller disconnects the main circuit. once the emergency safety circuit (i.e., emergency stop) is triggered, the robot will stop immediately regardless of the mode of operation, and cannot be started to operate again without an acknowledgment response to the alarm (i.e., the emergency stop is released, the power-up button is powered up), in the case the robot will no longer be controlled by the software program, and the operator cannot move the robot through the demonstrator. Therefore, another loop is needed for the movement of the robotic arm. In the case, it is necessary to provide the user with a way to quickly release brakes of the third-axis and the fourth-axis so that the user can move the colliding robotic arm in time to prevent secondary damage to the robot or surrounding equipment.

On the other hand, during the normal use of the motor with the brake, it is ensured that the brake can be released normally, otherwise, the robot operation process may easily cause a robot overload alarm or damage to the motor.

Figure 3:
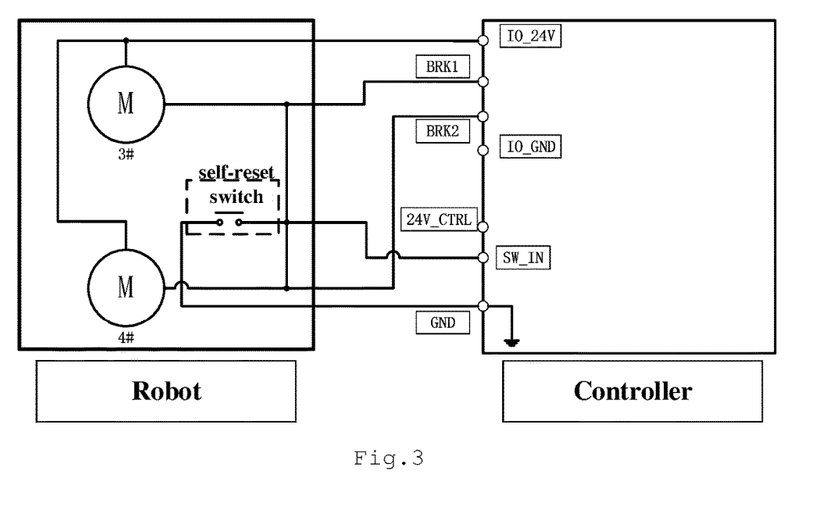
FIG. 3 is a schematic structural diagram of some embodiments of a robot and a controller, specifically a schematic diagram of the wiring of the robot body.

FIG. 3 is a schematic structural diagram of some embodiments of a robot and a controller, specifically a schematic diagram of the wiring of the robot body.

There are mainly two hardware release brake solutions used by some robot manufacturers that can quickly release the brake: First solution: a switch (such as, an external braking switch, see the brake release switch of the third joint in FIG. 2) is used to connect brake signal lines of two axes (for the connection, reference can be made to the example shown in FIG. 3). When the switch is pressed, the brakes of the two axes are released at the same time. However, when the power is on, it is impossible to control one axis to release braking independently. Second solution: only connected to a braking signal of one axis to control a certain line separately, but only one brake line can be controlled. In addition, neither of the two solutions completes a closed-loop control loop, both of them lack a state monitoring loop, and cannot monitor the braking release state.

In some embodiments, the solution of the present disclosure provides a motor release brake control solution for a SCARA robot.

The solution of the present disclosure is aimed at the problem that the robotic arm cannot be moved without power off and restart after an emergency stop is triggered for the robot, for example, the problem that the user need to be able to quickly release the braking of the third and fourth axes of the SCARA robot in an emergency situation. Through adding a hardware control loop that is compatible with the software control loop, emergency movement of the SCARA robot is enabled when no drive loop is available. In this way, when the SCARA robot is in an emergency state or if there is no drive loop available, the operator can manually release the braking of a motor and move the robotic arm.

Through adding a hardware control loop that is compatible with the software control loop, emergency movement of the SCARA robot is enabled when no drive loop is available. In normal operation, the added hardware circuit will not affect the software control. If a safety accident occurs and the emergency stop button is pressed in time, the robotic arm needs to be moved away for rescue or assets protection or the robotic arm needs to be moved back to a safety range. In the situation, releasing braking can only be achieved through hardware control. Without hardware releasing braking, it is very difficult to move a braked robotic arm, which can only be done by crane and other special tools. Therefore, the hardware control loop can solve the problem as much as possible. In the solution of the present disclosure, by means of a logic gate circuit, braking of the motor occurs only if the body switch of the robot is not pressed and the internal software of the controller gives a braking signal. Since a self-reset switch is used as the body switch of the robot, there is no need to worry about safety problems caused by failure to brake in time. In addition, the brake signal lines are not connected to each other, but are provided independently. Only the switch signal of the body switch of the robot is used as a unique signal input. Therefore, braking can be released regardless of whether the body switch is pressed or whether internal software control is enabled. In the non-emergency state, each axis can be enabled separately by software.

The solution of the present disclosure addresses the need of users that release brake control can be still achieved for each axis by means of software after adding the hardware release brake circuit. The self-reset switch is adopted to release a brake manually, thereby preventing the situation that the motor always stays in the braking release state during operation, and thus ensuring safety. In this way, the self-reset switch is adopted to release a brake manually. If the operator accidentally forgets to reset the button, the robotic arm will not fall down uncontrollably to avoid other dangers, thereby preventing the situation that the motor always stays in the braking release state during operation, and thus ensuring safety.

The self-reset switch is adopted to release a brake manually, thereby preventing the situation that the motor always stays in the braking release state during operation, and thus ensuring safety. If the switch cannot reset itself, and only can be reset manually, if the operator accidentally forgets to reset the button, the robotic arm may fall down uncontrollably, which may cause other dangers.

The solution of the present disclosure can address the problem that hardware release brake is not taken into account in state detection, lack of safety feedback for the hardware release brake circuit. In addition to adding a hardware control loop, a safety feedback loop is formed by introducing a switch signal in combination with a current sampling circuit, so as to further increase the safety of the robot. In other words, a control feedback loop is added for operation and control safety, making the whole system more stable as a closed-loop control system. Thus, in addition to adding a hardware control loop, a switch signal is introduced. The switch signal can be divided into two signals, one (SW_SIG) of which is the signal input involved in braking release, and the other (SW) is a feedback signal input to the FPGA (Field Programmable Gate Array). The switch signal input to the FPGA and the sampled current signal input to the FPGA can form a safety feedback loop to monitor the state of the body braking (or releasing braking) loop.

An exemplary description of a specific implementation of the present disclosure will be given below in conjunction with the example shown in FIGS. 4 and 5.

Figure 4:
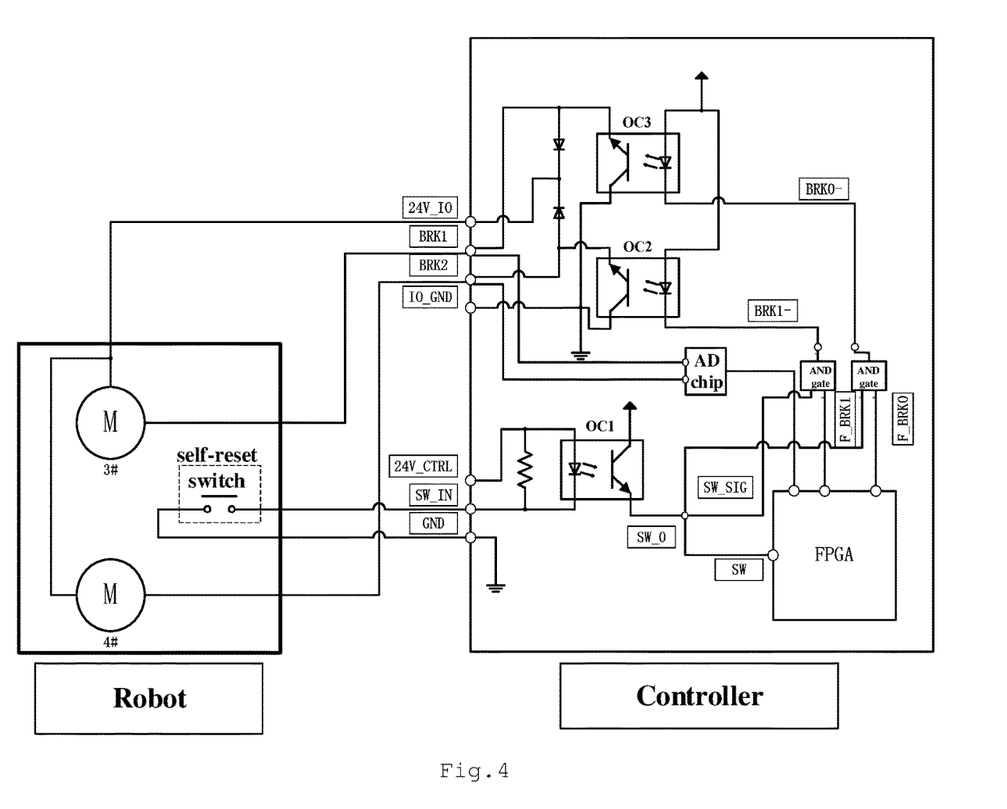
FIG. 4 is a schematic structural diagram of other embodiments of a robot and a controller.

FIG. 4 is a schematic structural diagram of other embodiments of a robot and a controller. Compared to FIG. 3, both the "controller" and the body wiring of the "robot" are changed in FIG. 4. In general, the way in which the switch control signal is obtained in the control loop is changed. That is, instead of directly connecting the body switch of the robot to a brake line on the "robot" in FIG. 3, the body switch of the robot, as a signal input, is not directly connected to the brake line. In the case, the body switch of the robot indirectly controls the signal of the brake signal line through an internal logic gate of the "controller". In the examples shown in FIGS. 3 and 4, "FPGA_BRK1", "FPGA_BRK0", "SW" and the like in the controller are network names. "3 #" and "4 #" are the third and fourth axes motors respectively. "Self-reset switch" is a button switch, which is turned on when pressed and turned off when released, so marked as "self-reset".

Figure 5:
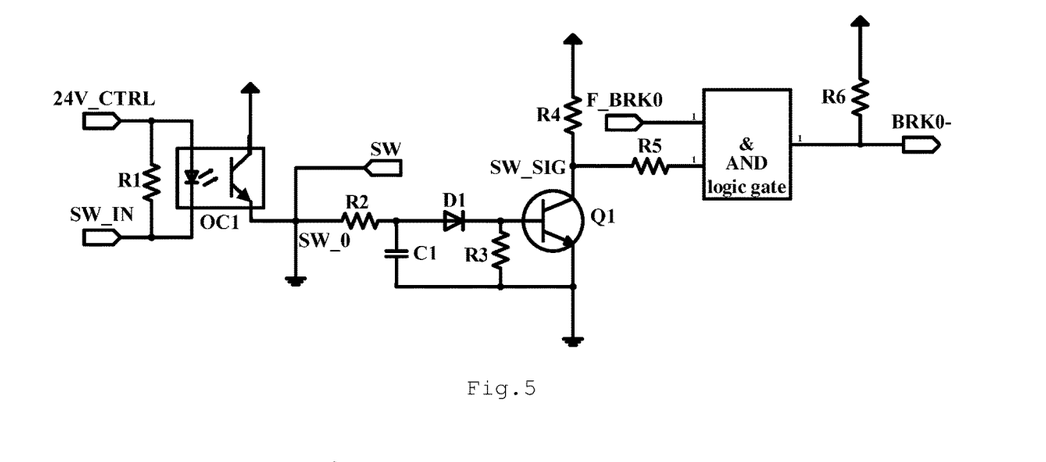
FIG. 5 is a schematic structural diagram of some embodiments of a control circuit of the controller in FIG. 4.

FIG. 5 is a schematic structural diagram of some embodiments of a control circuit of the controller in FIG. 4. In the examples shown in FIGS. 4 and 5, "F_BRK0", "BRK0-", "SW", "SW_0", "SW", "SW_SIG", and the like are network names. "AD chip" is a current sampling chip, an output signal of which is a feedback signal. "AND logic gate" is a logic device, and its operational expression is: Y=A·B, wherein A and B are input logic levels respectively, and Y is an output logic level. In FIG. 4, there is a one-to-one correspondence between the signal network names (e.g., "BRK0-") and the "AND logic gate" devices.

As shown in FIG. 4, a motor brake release control device of a SCARA robot provided by the solution of the present disclosure comprises: a preceding-stage optocoupler circuit, a triode transistor circuit, a drive circuit (not shown in the figure), a logic gate circuit, and a post-stage optocoupler circuit. There are two logic gate circuits, comprising a first logic gate circuit and a second logic gate circuit. The preceding-stage optocoupler circuit comprises a first optocoupler OC1, and the post-stage optocoupler circuit comprises a second optocoupler OC2 and a third optocoupler OC3. A resistor R1 is connected in parallel between an anode and a cathode of a diode side in the first optocoupler OC1. A diode is also provided between an emitter of a transistor side in the second optocoupler OC2 and the direct-current power supply. A diode is also provided between an emitter of a transistor side in the third optocoupler OC3 and the direct-current power supply.

The drive circuit (or drive chip) is arranged between the FPGA output network "FPGA_BRK0/1" and the logic gate circuit input network "F_BRK0/1", which can enhance the load capacity of the braking signal network output from the FPGA side (i.e., the drive ability). The chip is a drive chip.

The resistor on the diode side of the preceding-stage optocoupler is a bypass resistor, which is used for shunt and bypass, for protecting the diode in the preceding-stage optocoupler.

The role of the diode on the transistor side in the post-stage optocoupler is to use its single-conductor characteristic to act as a current continuity. Since the post-stage optocoupler is connected to an inductive load, the inductive load will produce a high back electromotive force. At the moment when the brake coil is powered off (when the robot changes from the brake releasing state to the braking state), the coil and the diode connected in parallel form a loop that provides a discharge path for the induced back electromotive force, which has the effect of the current continuity.

The switch signal of the body switch of the robot (a self-reset switch) is input to an input terminal of the first logic gate circuit after passing through a preceding-stage optocoupler circuit and a triode transistor circuit (see the example shown in FIG. 5). The control signal of the FPGA is input to an input terminal of the first logic gate circuit through a drive circuit. Two signals are input to the first logic gate circuit, which outputs a braking (or releasing braking) control signal that is output to an input terminal of a post-stage optocoupler circuit. An output signal of the post-stage optocoupler circuit is pulled up and output to an external robot motor. The diode, capacitor, resistor, triode and other components between the "And logic gate" and "preceding-stage optocoupler" are omitted in FIG. 4. In addition, there are two control signals in FIG. 4, but only one is drawn in FIG. 5 because the circuits of the two signals are identical.

As shown in FIG. 5, the triode transistor circuit comprises: a resistor R2, a resistor R3, a resistor R4 and a resistor R5, a capacitor C1, a diode D1, and a triode Q1. A resistor R6 is also connected to an output terminal of a second logic gate circuit (such as an AND logic gate). An emitter on a transistor side in the first optocoupler OC1 is connected to an anode of the diode D1 through the resistor R2, and is also connected to an emitter of the triode Q1 through the capacitor C1. A cathode of the diode D1 is connected to a base of the triode Q1, and the base of the triode Q1 is also connected to the emitter of the triode Q1 through the resistor R3. A collector of the triode Q1 is connected to an input terminal of the second logic gate circuit (e.g., the AND logic gate) through the resistor R5. The collector of the triode Q1 is also connected to the resistor R4.

In the triode transistor circuit, the resistor R2 is a current-limiting resistor for buffering and protection. The resistor R2 and the capacitor C1 constitute an RC filter circuit. The resistor R3 is a pull-down resistor, which provides bias voltage to the transistor, shunts, and protects the transistor; the resistor R4 is a pull-up resistor; the resistor R5 is a current-limiting resistor or absorbing resistor, which can protect the logic device; the resistor R6 is a pull-up resistor, and the diode D1 can protect the preceding-stage optocoupler taking advantage of the unidirectional conduction characteristic of the diode.

The control process of the above SCARA robot motor release brake control device will be described below.

In a braking state:

When a motor is not under control, it should be in the braking state, that is, the "BRK1" and "BRK2" signals should be in a high level state. A motor that is not under control means that it is not under software control. Upon adding a hardware loop, it is still necessary to realize the high level state of the "BRK1" and "BRK2" signals.

In the example shown in FIGS. 4 and 5, when a motor is not under software control, the signal networks F_BRK0 and F_BRK1 input to the second logic gate circuit (i.e., the AND gate) by the FPGA are pulled up and output a high level (logic level 1). At that point, the switch is in the turn-off state, and the "SW_IN" network is pulled up by the "24V_CTRL" power supply network. In the situation, the preceding-stage optocoupler circuit is not turned on. The "SW" and "SW_0" networks are grounded. In the situation, the triode transistor circuit is not turned on, the "SW_SIG" network is pulled up and a high level (logic level 1) is output. According to Y=A·B, it can be known that a logic level 1 is output, that is, the networks "BRK0-" and "BRK1-" output a high level. In the situation, the post-stage optocoupler circuit is also not turned on, and the signal "BRK1"/"BRK2" output to the motor is directly pulled up by "24V_IO", and thereby outputs a high level, and the motor enters the braking state, which is consistent with the requirement.

Since the body switch of the robot is a self-reset switch, releasing the button will automatically return it to the open (non-closed) state, in which situation the produced signal is in a sense no different from that before the hardware circuit is added. Therefore, it is compatible with the software.

In the situation that a release brake signal and an enable signal are transmitted:

It is required to realize releasing braking by pressing a switch on the robot without software control; and braking of the motor of the robot can also be released after an enable signal is transmitted by software control.

In the example shown in FIGS. 4 and 5, in the case of manual releasing braking, the self-reset switch is pressed, the "SW_IN" network is grounded, and a low level (logic level 0) is output. In the situation, the preceding-stage optocoupler circuit is turned on, the networks "SW" and "SW_0" are pulled up and output a high level. Then, a triode transistor circuit is turned on, the "SW_SIG" network is grounded and outputs a low level (logic level 0). According to Y=A·B, it can be known that a logic level 0 is output, that is, networks "BRK0-" and "BRK1-" output a low level, the post-stage optocoupler circuit is then turned on, so that a signal "BRK1"/"BRK2" output to the motor is grounded, a low level is output, and the braking is released.

In the example shown in FIGS. 4 and 5, if FPGA control is enabled, signal networks "F_BRK0" and "F_BRK1" input to the AND gate (i.e., a second logic gate circuit) by the FPGA are controlled by software to output a low level (logic level 0). According to Y=A·B, it can be known that a logic level 0 is output, that is, networks "BRK0-" and "BRK1-" output a low level. The post-stage optocoupler circuit is then turned on, the signal "BRK1"/"BRK2" output to the motor is grounded, a low level is output, and the braking is released.

Thus, both of the two releasing braking situations can be achieved after adding the hardware loop.

In the situation that the hardware control loop is compatible with the software control loop:

When the entire system is not in an emergency state (that is, the emergency stop button is not pressed), releasing the braking can be controlled by both the hardware control loop and the software control loop. In the case, the switch signal can be divided into two signals, one (SW_SIG) of which is a signal involved in braking release, and the other (SW) is input to the FPGA as a feedback signal. When the internal programs of the robot run normally, the robotic arm maintains its original state by a maintenance current, and should not receive a low level SW signal. If the body switch of the robot (i.e., the self-reset switch) is pressed in the normal operation of the robot to avoid safety accidents caused by human misoperation, the feedback signal SW should be involved. The FPGA detects an abnormal low level, stops the robot, and issues an alert.

If the body switch is pressed for debugging, in the situation, if someone wants to start the robot, the FPGA will disable the starting of the robot based on the sampled current signal (which is converted into a digital signal by an AD chip and input to the FPGA as a feedback of the body state) and the SW signal (a signal controlling the body switch), thereby avoiding safety accidents.

It can be seen that the solution of the present disclosure is mainly to achieve an effect that, after changing the hardware control circuit, releasing braking can be achieved in combination with the software in a better manner or without reduction of the original function, thereby achieving joint control of the software program and the hardware circuit. In addition, the hardware circuit control unit used in the solution of the present disclosure is an optocoupler circuit, a triode transistor circuit, a NAND gate, a NOT gate, and the like, instead of a relay and a 38 decoder, nor a simple amplifier. The NAND gate and the AND gate are connected in series to realize the AND logic function.

Since the processing and functions achieved by the robot in some embodiments substantially correspond to the embodiment, principle and example of the device shown in FIG. 1 above, for the details not described in the embodiment, please refer to the relevant description in the above embodiment, which will not repeat herein.

The technical solution of the present disclosure has been verified through a large number of tests. By adding a hardware control loop that is compatible with the software control loop, the self-reset switch is used in manual releasing braking, so as to avoid that the motor is always in the braking release state during operation, and thereby ensuring safety.

Figure 6:
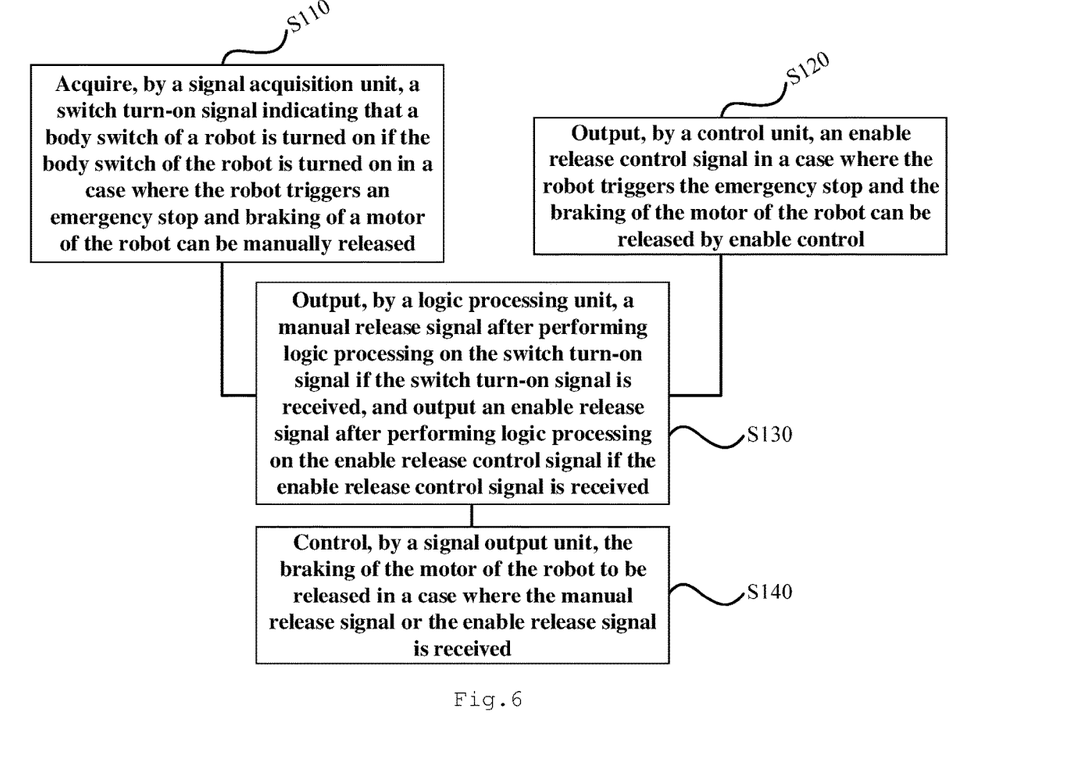
FIG. 6 is a schematic flowchart of some embodiments of a robot control method of the present disclosure.

According to some embodiments of the present disclosure, a robot control method corresponding to the robot is further provided. FIG. 6 is a schematic flowchart of some embodiments of a method of the present disclosure. The robot control method can be applied to motor braking release control of a SCARA robot, and the motor braking release control method of the SCARA robot comprises: steps S110 to S140.

At step S110, in a case where a robot triggers an emergency stop and braking of a motor of the robot can be manually released, if a body switch of the robot is turned on, a switch turn-on signal indicating that a body switch of a robot is turned on is acquired by a signal acquisition unit that is connected to the body switch (such as, a self-reset switch) of the robot.

At step S120, an enable release control signal is output by a control unit in a case where the robot triggers the emergency stop and the braking of the motor of the robot can be released by enable control.

At step S130, in the case where the robot triggers the emergency stop and the braking of the motor of the robot can be manually released, if the switch turn-on signal is received, a manual release signal is output by a logic processing unit after logic processing is performed on the switch turn-on signal; and in the case where the robot triggers the emergency stop and the braking of the motor of the robot can be released by enable control, if the enable release control signal is received, an enable release signal is output by a logic processing unit after logic processing is performed on the enable release control signal.

At step S140, the braking of the motor of the robot is controlled to be released by a signal output unit in a case where the manual release signal or the enable release signal is received. A braking signal is provided separately for one or more motors in the robot. Since the brake signal lines are not connected to each other, but are provided independently, and only the switch signal of the body switch of the robot is used as a unique signal input, braking can be released regardless of whether the body switch is pressed or whether internal software control is enabled. In the non-emergency state, each axis can be enabled separately by software.

For example: in a case where a release brake signal and an enable signal are transmitted: both of the two release brake situations can be achieved after adding the hardware loop. Specifically, releasing braking can be achieved through pressing a switch on the "robot" without software control. Braking of the motor can also be released for the robot upon an enable signal is transmitted by software control.

In the case of manual releasing brake, the self-reset switch is pressed, the "SW_IN" network is grounded, and a low level (logic level 0) is output. In the situation, the preceding-stage optocoupler circuit is turned on, the networks "SW" and "SW_0" are pulled up and output a high level. Then, a triode transistor circuit is turned on, the "SW_SIG" network is grounded and outputs a low level (logic level 0). According to Y=A·B, it can be known that a logic level 0 is output, that is, networks "BRK0-" and "BRK1-" output a low level, the post-stage optocoupler circuit is then turned on, so that a signal "BRK1"/"BRK2" output to the motor is grounded, a low level is output, and the braking is released.

If FPGA control is enabled, signal networks "F_BRK0" and "F_BRK1" input to the AND gate (i.e., a second logic gate circuit) by the FPGA are controlled by software to output a low level (logic level 0). According to Y=A·B, it can be known that a logic level 0 is output, that is, networks "BRK0-" and "BRK1-" output a low level. The post-stage optocoupler circuit is then turned on, the signal "BRK1"/"BRK2" output to the motor is grounded, a low level is output, and the braking is released.

Therefore, a hardware control loop compatible with the software control loop can be formed by the signal acquisition unit, the control unit, the logic processing unit and the signal output unit, which enables emergency movement of the SCARA robot when no drive loop is available. For example, for the problem of unable to move the robotic arm without power off and restart after the robot triggering an emergency stop, the user needs to quickly release the braking of the third and fourth axes of the SCARA robot in an emergency state, that is, when the SCARA robot is in an emergency state or no drive loop is available, the operator can manually release the braking of a motor and move the robotic arm, thereby improving safety.

In some embodiments, the body switch of the robot comprises a self-reset switch. A first terminal of the self-reset switch is connected to an input terminal (such as, a SW_IN terminal) of the signal acquisition unit, and a second terminal of the self-reset switch is grounded (such as, connected to the analog ground GND). The self-reset switch is a normally open switch, and is turned on when it is pressed. For example: the switch signal of the body switch of the robot is only used as a signal input, and is not directly connected to a brake line.

During emergency stop control, control can be performed by the control unit. Specifically, the control unit outputs an enable brake control signal in a case where the robot needs to trigger an emergency stop. The logic processing unit, in a case where the robot needs to trigger an emergency stop and if the enable brake control signal is received, outputs an enable brake signal after performing logic processing on the enable brake control signal. The signal output unit controls a motor of the robot to brake in a case of receiving the enable brake signal.

In a case where the motor of the robot has triggered an emergency stop through the control unit, if the self-reset switch is reset, the state of braking of the motor will not be affected. For details, please refer to the following exemplary description.

In some embodiments, the robot control method further comprises: a process of maintaining braking of the motor after the self-reset switch is reset.

Figure 7:
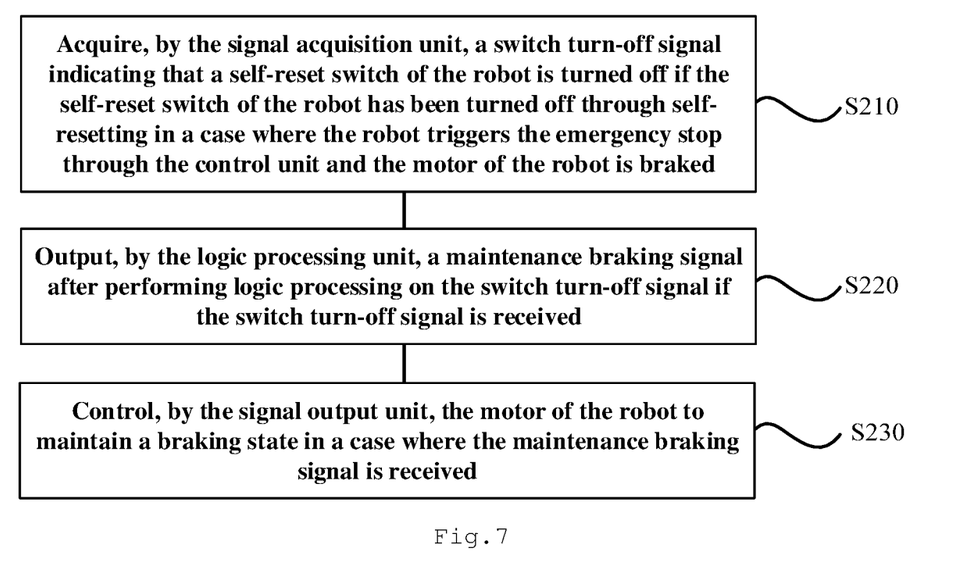
FIG. 7 is a schematic flowchart of some embodiments of maintaining the braking of the motor after the self-reset switch is reset in the method of the present disclosure.

In conjunction with FIG. 7, which is a schematic flowchart of some embodiments of maintaining braking of the motor after the self-reset switch is reset in the method of the present disclosure, the specific process of maintaining braking of the motor after the self-reset switch is reset will be further described below, comprising: steps S210 to S230.

At step S210, in a case where the robot triggers the emergency stop through the control unit and the motor of the robot is braked, if the self-reset switch of the robot has been turned off through self-resetting, a switch turn-off signal indicating that the self-reset switch of the robot is turned off is acquired by the signal acquisition unit.

At step S220, in the case where the robot triggers the emergency stop through the control unit and the motor of the robot is braked, if the switch turn-off signal is received, a maintenance braking signal is output by the logic processing unit after logic processing is performed on the switch turn-off signal.

At step S230, the motor of the robot is controlled to maintain a braking state by the signal output unit in a case where the maintenance braking signal is received.

In the braking state: when a motor is not under control, it should be in the braking state, that is, the "BRK1" and "BRK2" signals should be in a high level state. A motor that is not under control means that it is not under software control. Upon adding a hardware loop, it is still necessary to realize the high level state of the "BRK1" and "BRK2" signals.

When a motor is not under software control, the signal networks F_BRK0 and F_BRK1 input to a second logic gate circuit (i.e., AND gate) by the FPGA are pulled up and output a high level (logic level 1). At that point, the switch is in the turn-off state, and the "SW_IN" network is pulled up by the "24V_CTRL" power supply network. In the situation, the preceding-stage optocoupler circuit is not turned on. The "SW" and "SW_0" networks are grounded. In the situation, the triode transistor circuit is not turned on, the "SW_SIG" network is pulled up and a high level (logic level 1) is output. According to Y=A·B, it can be known that a logic level 1 is output, that is, the networks "BRK0-" and "BRK1-" output a high level. In the case, the post-stage optocoupler circuit is also not turned on, and the signal "BRK1" and "BRK2" output to the motor is directly pulled up by "24V_IO", and thereby outputs a high level, and the motor enters the braking state, which is consistent with the requirement.

"BRK1" and "BRK2" are: third axis motor braking signal and fourth axis motor braking signal. A third axis post-stage optocoupler outputs the third axis motor braking signal, and a fourth axis post-stage optocoupler outputs the fourth axis motor braking signal.

"F_BRK0", "F_BRK1": third axis braking signal output by the FPGA that passes through a drive circuit and then is input to a logic device, fourth axis braking signal output by the FPGA that passes through a drive circuit and then is input to a logic device.

"BRK0-" and "BRK1-": third axis braking signal input to a post-stage optocoupler after processing of a logic device, fourth axis braking signal input to a post-stage optocoupler after processing of a logic device.

"24V_CTRL": 24V power supply network at a preceding-stage optocoupler in the controller.

"24V_IO": 24V power supply network at a post-stage optocoupler in the controller.

"SW", "SW_0", "SW_SIG": switch feedback signal output to FPGA by the preceding-stage optocoupler, switch signal output to the triode transistor circuit by the preceding-stage optocoupler, switch signal output to logic device by the triode transistor circuit.

Since the body switch of the robot is a self-reset switch, releasing the button will automatically return it to the open (non-closed) state, in which situation the signal is in a sense no different from that before the hardware circuit is added. Therefore, it is compatible with the software.

Therefore, since a self-reset switch is used as the body switch of the robot, there is no need to worry about safety problems caused by failure to brake in time. Specifically, a self-reset switch is used as the body switch of the robot. The self-reset switch is adopted when a brake is manually released. If the operator accidentally forgets to reset the button, the robotic arm will not fall down uncontrollably to avoid other dangers, thereby preventing the situation that the motor always stays in the braking release state during operation, and thus ensuring safety.

In some embodiments, the method further comprises: a process of monitoring a state of a body of the robot.

Figure 8:
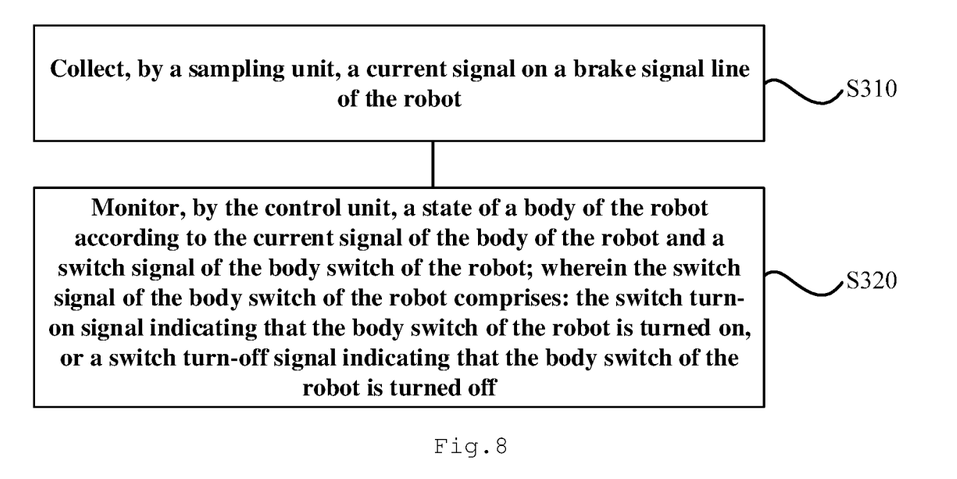
FIG. 8 is a schematic flowchart of some embodiments of monitoring the body state of the robot in the method of the present disclosure.

In conjunction with FIG. 8, which is a schematic flowchart of some embodiments of motoring the state of the body of the robot in the method of the present disclosure, the specific process of motoring the state of the body of the robot will be further described below, comprising: steps S310 and S320.

At step S310, by a sampling unit, a current signal on a brake signal line of the robot is collected, and the collected current signal is fed back to a feedback terminal of the control unit.

At step S320, a state of a body of the robot is monitored by the control unit according to the current signal of the body of the robot and a switch signal of the body switch of the robot. The switch signal of the body switch of the robot comprises: a switch turn-on signal indicating that the body switch of the robot is turned on, or a switch turn-off signal indicating that the body switch of the robot is turned off. Specifically, the switch signal of the body switch of the robot is a switch signal output by an emitter of a transistor side of a preceding-stage optocoupler circuit, such as a first optocoupler, in the information acquisition unit.

For example: in addition to adding a hardware control loop, a switch signal is introduced. The switch signal can be divided into two signals, one (SW_SIG) of which is a signal input involved in braking release, and the other (SW) is a feedback signal input to the FPGA (Field Programmable Gate Array). The switch signal input to the FPGA and the sampled current signal input to the FPGA can form a safety feedback loop to monitor the state of the body braking (or releasing brake) loop.

Therefore, in addition to adding a hardware control loop, a safety feedback loop is formed by introducing a switch signal in combination with the current sampling circuit, so as to further increase the safety of the robot.

In some embodiments, the specific process of the monitoring of, by the control unit, the state of the body of the robot according to the current signal of the body of the robot and the switch signal of the body switch of the robot at step S320 comprises any of the following monitoring situations.

First monitoring situation: in a case where the robot is in normal operation, if the current signal indicates that the robot is in normal operation and the switch signal indicates that the body switch of the robot is turned on from a turn-off state, it determines that the body switch of the robot is turned on due to misoperation, the robot is controlled to stop, and an alert message that the robot is misoperated during normal operation is initiated.

Second monitoring situation: in a case where the robot is in a braking state, if the current signal indicates that the robot is in the braking state and the switch signal indicates that the body switch of the robot is turned on from the turn-off state, it determines that the robot is started by mistake and the robot is controlled to disable starting.

For example: in a case where the hardware control loop is compatible with the software control loop, when the entire system is not in an emergency state (that is, the emergency stop button is not pressed), releasing the braking can be controlled by both the hardware control loop and the software control loop. In the case, the switch signal can be divided into two signals, one (SW_SIG) of which is a signal involved in braking release, and the other (SW) is input to the FPGA as a feedback signal.

If the internal programs of the robot run normally, the robotic arm maintains its original state by a maintenance current, and should not be receive a low level SW signal. If the body switch of the robot (i.e., the self-reset switch) is pressed in the normal operation of the robot to avoid safety accidents caused by human misoperation, the feedback signal of SW should be involved. The FPGA detects an abnormal low level, stops the robot, and issues an alert. If the body switch is pressed for debugging, in the situation, if someone wants to start the robot, the FPGA will disable the starting of the robot based on the sampled current signal (which is converted into a digital signal by an AD chip and input to the FPGA as a feedback of the body state) and the SW signal (a signal controlling the body switch), thereby avoiding safety accidents.

Since the processing and functions achieved by the method of some embodiments substantially correspond to the embodiment, principle and example of the robot described above, for the details not described in the embodiment, please refer to the relevant description in the above embodiment, which will not repeat herein.

The technical solution of the present disclosure has been verified through a large number of tests. By adding a hardware control loop that is compatible with the software control loop, in addition to adding the hardware control loop, a safety feedback loop is formed by introducing a switch signal in combination with a current sampling circuit, so as to further increase the safety of the robot.

To sum up, it is easy for those skilled in the art to understand that the above mentioned advantageous ways can be freely combined and superimposed on the premise of no conflict.

The above description is only embodiments of the present disclosure and is not intended to limit the present disclosure. For those skilled in the art, the present disclosure may have various modifications and changes. Any modifications, equivalent replacements, or improvements made within the spirit and principle of the present disclosure shall be comprised in the scope of the claims of the present disclosure.

What is claimed is:

1. A robot control device, comprising: a signal acquisition unit, a control unit, a logic processing unit, and a signal output unit; wherein:
   the signal acquisition unit is configured to acquire a switch turn-on signal indicating that a body switch of a robot is turned on if the body switch of the robot is turned on in a case where the robot triggers an emergency stop and braking of a motor of the robot can be manually released;
   the control unit is configured to output an enable release control signal in a case where the robot triggers the emergency stop and the braking of the motor of the robot can be released by enable control;
   the logic processing unit is configured to output a manual release signal after performing logic processing on the switch turn-on signal if the switch turn-on signal is received, and output an enable release signal after performing logic processing on the enable release control signal if the enable release control signal is received; and the signal output unit is configured to control the braking of the motor of the robot to be released in a case where the manual release signal or the enable release signal is received;
   wherein a number of an output terminal of the signal acquisition unit, a number of the logic processing unit, and a number of the signal output unit are consistent with a number of the motor in the robot that need to be braked or released from braking;
   in a case where the number of the motor in the robot that need to be braked or released from the braking is two, the motor in the robot that need to be braked or released from the braking comprises a first motor and a second motor; the output terminal of the signal acquisition unit comprises: a first output terminal and a second output terminal; the logic processing unit comprises: a first logic processing unit and a second logic processing unit; the signal output unit comprises: a first signal output unit and a second signal output unit; wherein:
   the first output terminal of the signal acquisition unit is connected to a first input terminal of the first logic processing unit, an output terminal of the first logic processing unit is connected to an input terminal of the first signal output unit, and an output terminal of the first signal output unit is connected to a control terminal of the first motor which is for braking or releasing the braking;
   the second output terminal of the signal acquisition unit is connected to a first input terminal of the second logic processing unit, an output terminal of the second logic processing unit is connected to an input terminal of the second signal output unit, and an output terminal of the second signal output unit is connected to a control terminal of the second motor which is for braking or releasing the braking; and
   a first enable control terminal of the control unit is connected to a second input terminal of the first logic processing unit, and a second enable control terminal of the control unit is connected to a second input terminal of the second logic processing unit.

2. The robot control device according to claim 1, wherein the body switch of the robot comprises a self-reset switch, wherein a first terminal of the self-reset switch is connected to an input terminal of the signal acquisition unit, and a second terminal of the self-reset switch is grounded; wherein the self-reset switch is a normally open switch, and is turned on when it is pressed; and
   the signal acquisition unit is further configured to acquire a switch turn-off signal indicating that the self-reset switch of the robot is turned off if the self-reset switch of the robot has been turned off through self-resetting in a case where the robot triggers the emergency stop through the control unit and the motor of the robot is braked;
   the logic processing unit is further configured to output a maintenance braking signal after performing logic processing on the switch turn-off signal if the switch turn-off signal is received; and
   the signal output unit is further configured to control the motor of the robot to maintain a braking state in a case where the maintenance braking signal is received.

3. The robot control device according to claim 1, further comprising: a sampling unit, wherein the sampling unit is configured to collect a current signal on a brake signal line of the robot;
   wherein the control unit is further configured to monitor a state of a body of the robot according to the current signal of the body of the robot and a switch signal of the body switch of the robot; wherein the switch signal of the body switch of the robot comprises: the switch turn-on signal indicating that the body switch of the robot is turned on, or a switch turn-off signal indicating that the body switch of the robot is turned off.

4. The robot control device according to claim 3, wherein the control unit monitoring the state of the body of the robot according to the current signal of the body of the robot and the switch signal of the body switch of the robot comprises:
   controlling the robot to stop and initiating an alert message that the robot is misoperated during normal operation, in a case where the robot is in normal operation, if the current signal indicates that the robot is in normal operation and the switch signal indicates that the body switch of the robot is turned on from a turn-off state; and
   controlling the robot to disable starting, in a case where the robot is in a braking state, if the current signal indicates that the robot is in the braking state and the switch signal indicates that the body switch of the robot is turned on from the turn-off state.

5. The robot control device according to claim 1, wherein the signal acquisition unit comprises: a first optocoupler module, a first switch module and a second switch module; wherein:
   a diode side of the first optocoupler module is connected to the body switch of the robot, and a transistor side of the first optocoupler module is capable of outputting a switch signal of the body switch of the robot; wherein:
   the switch signal of the body switch of the robot is output to the first input terminal of the first logic processing unit after being processed by the first switch module;

the switch signal of the body switch of the robot is output to the first input terminal of the second logic processing unit after being processed by the second switch module; and the switch signal of the body switch of the robot is further output to a feedback terminal of the control unit.

6. The robot control device according to claim 5, wherein a structure of the first switch module is the same as a structure of the second switch module; and the first switch module comprises a first triode transistor module; wherein:

a base of the first triode transistor module is connected to an emitter of the transistor side of the first optocoupler module; and a collector of the first triode transistor module, as an output terminal of the first switch module, is connected to the first input terminal of the first logic processing unit.

7. The robot control device according to claim 1, wherein a structure of the first logic processing unit is the same as a structure of the second logic processing unit; and the first logic processing unit comprises a first AND gate module; wherein:

a first input terminal of the first AND gate module is connected to the first output terminal of the signal acquisition unit, a second input terminal of the first AND gate module is connected to the first enable control terminal of the control unit, and an output terminal of the first AND gate module is connected to the input terminal of the first signal output unit.

8. The robot control device according to claim 1, wherein a structure of the first signal output unit is the same as a structure of the second signal output unit; and the first signal output unit comprises a second optocoupler module; wherein:

a cathode of a diode side of the second optocoupler module is connected to the output terminal of the first logic processing unit, and an emitter of a transistor side of the second optocoupler module is connected to a control terminal of the first motor which is for braking or releasing the braking.

9. The robot, comprising: the robot control device according to claim 1.

10. A robot control method, comprising:

acquiring, by a signal acquisition unit, a switch turn-on signal indicating that a body switch of a robot is turned on if the body switch of the robot is turned on in a case where the robot triggers an emergency stop and braking of a motor of the robot can be manually released;

outputting, by a control unit, an enable release control signal in a case where the robot triggers the emergency stop and the braking of the motor of the robot can be released by enable control;

outputting, by a logic processing unit, a manual release signal after performing logic processing on the switch turn-on signal if the switch turn-on signal is received, and outputting an enable release signal after performing logic processing on the enable release control signal if the enable release control signal is received; and controlling, by a signal output unit, the braking of the motor of the robot to be released in a case where the manual release signal or the enable release signal is received;

wherein a number of an output terminal of the signal acquisition unit, a number of the logic processing unit, and a number of the signal output unit are consistent with a number of the motor in the robot that need to be braked or released from braking;

in a case where the number of the motor in the robot that need to be braked or released from the braking is two, the motor in the robot that need to be braked or released from the braking comprises a first motor and a second motor; the output terminal of the signal acquisition unit comprises: a first output terminal and a second output terminal; the logic processing unit comprises: a first logic processing unit and a second logic processing unit; the signal output unit comprises: a first signal output unit and a second signal output unit; wherein:

the first output terminal of the signal acquisition unit is connected to a first input terminal of the first logic processing unit, an output terminal of the first logic processing unit is connected to an input terminal of the first signal output unit, and an output terminal of the first signal output unit is connected to a control terminal of the first motor which is for braking or releasing the braking;

the second output terminal of the signal acquisition unit is connected to a first input terminal of the second logic processing unit, an output terminal of the second logic processing unit is connected to an input terminal of the second signal output unit, and an output terminal of the second signal output unit is connected to a control terminal of the second motor which is for braking or releasing the braking; and a first enable control terminal of the control unit is connected to a second input terminal of the first logic processing unit, and a second enable control terminal of the control unit is connected to a second input terminal of the second logic processing unit.

11. The robot control method according to claim 10, wherein the body switch of the robot comprises a self-reset switch, wherein a first terminal of the self-reset switch is connected to an input terminal of the signal acquisition unit, and a second terminal of the self-reset switch is grounded; wherein the self-reset switch is a normally open switch, and is turned on when it is pressed; and the robot control method further comprises:

acquiring, by the signal acquisition unit, a switch turn-off signal indicating that the self-reset switch of the robot is turned off if the self-reset switch of the robot has been turned off through self-resetting in a case where the robot triggers the emergency stop through the control unit and the motor of the robot is braked;

outputting, by the logic processing unit, a maintenance braking signal after performing logic processing on the switch turn-off signal if the switch turn-off signal is received; and controlling, by the signal output unit, the motor of the robot to maintain a braking state in a case where the maintenance braking signal is received.

12. The robot control method according to claim 10, further comprising:

collecting, by a sampling unit, a current signal on a brake signal line of the robot; and monitoring, by the control unit, a state of a body of the robot according to the current signal of the body of the robot and a switch signal of the body switch of the robot; wherein the switch signal of the body switch of the robot comprises: the switch turn-on signal indicating that the body switch of the robot is turned on, or a switch turn-off signal indicating that the body switch of the robot is turned off.

13. The robot control method according to claim 12, wherein the monitoring of, by the control unit, the state of the body of the robot according to the current signal of the body of the robot and the switch signal of the body switch of the robot comprises:
  controlling the robot to stop and initiating an alert message that the robot is misoperated during normal operation, in a case where the robot is in normal operation, if the current signal indicates that the robot is in normal operation and the switch signal indicates that the body switch of the robot is turned on from a turn-off state; and
  controlling the robot to disable starting, in a case where the robot is in a braking state, if the current signal indicates that the robot is in the braking state and the switch signal indicates that the body switch of the robot is turned on from the turn-off state.

* * * * *